Figure 4:
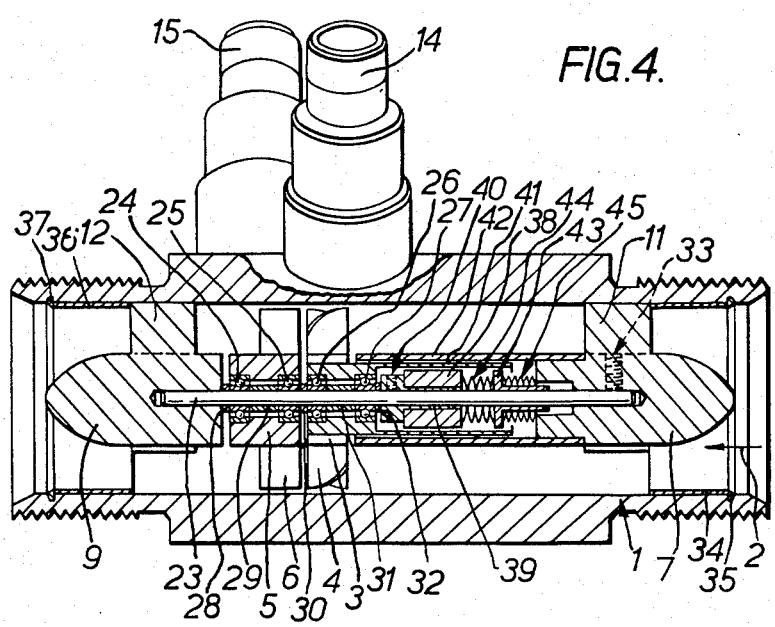

April 13, 1965  R. A. BROOKING  3,177,712
MASS FLOW SENSING UNITS
Filed Dec. 14, 1962  2 Sheets-Sheet 1
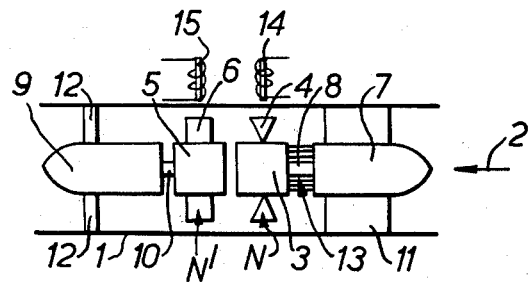
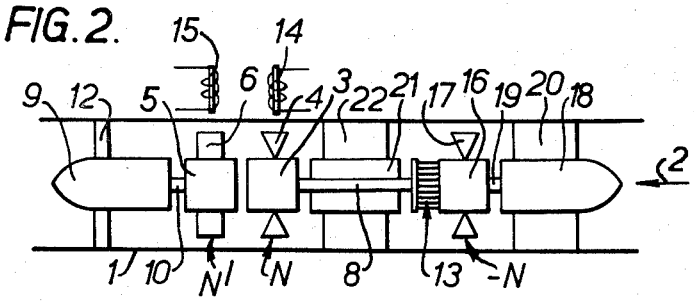
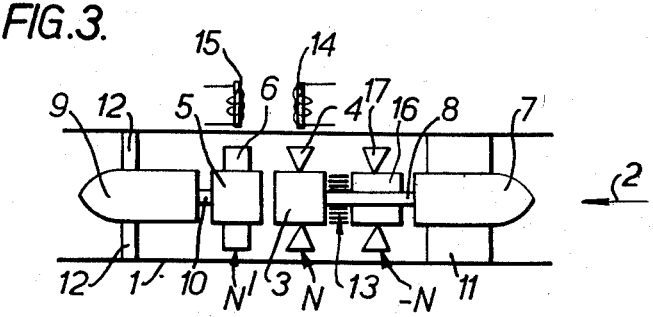
INVENTOR
Rowland A. Brooking
By Watson, Cole, Grindle & Watson
ATTORNEYS April 13, 1965  R. A. BROOKING  3,177,712
MASS FLOW SENSING UNITS Filed Dec. 14, 1962  2 Sheets-Sheet 2

INVENTOR
Rowland A. Brooking

By Watson, Cole, Grindle & Watson
ATTORNEYS

United States Patent Office 3,177,712
Patented Apr. 13, 1965

3,177,712
MASS FLOW SENSING UNITS
Rowland A. Brooking, Glamorganshire, Wales, assignor to Elliott (Treforest) Limited, Glamorganshire, Wales, a British company
Filed Dec. 14, 1962, Ser. No. 244,800
Claims priority, application Great Britain, Dec. 21, 1961, 45,855/61
9 Claims. (Cl. 73—231)

This invention relates to mass flow sensing units, and seeks to provide a sensing unit from which electrical signals may be obtained in a form facilitating ready computation of the rate or amount of flow of fluid in terms of mass passing through the sensing unit.

In its broadest aspect, the invention provides a mass flow sensing unit comprising a conduit or pipe section through which a fluid may be arranged to flow, a first rotor mounted within the conduit for rotation by the flow of fluid about an axis running lengthwise of the conduit and provided with helical fluid passageways therethrough, a second rotor mounted coaxially with the first rotor downstream thereof for rotation by the first rotor and provided with fluid passageways running parallel with the said axis, restraining means for applying to the first rotor a restraining torque whose magnitude is proportional to the angular velocity of the first rotor, and pick-off devices associated with the two rotors, each pick-off device being arranged to generate an electrical signal dependent upon the angular velocity of its associated rotor.

Although the invention is not limited thereto, and includes within its scope first and second rotors which may for example be cast with cylindrical or other passageways therethrough, it is particularly convenient to provide the rotors with blades so that the fluid passageways are formed by the spaces between the blades. The invention then provides a mass flow sensing unit comprising a conduit or pipe section through which a fluid may be arranged to flow, a first rotor having blades of helical pitch mounted within the conduit for rotation by the flow of fluid about an axis running lengthwise of the conduit, a second rotor having blades of infinite pitch mounted coaxially with the first rotor downstream thereof for rotation by fluid leaving the first rotor, restraining means for applying to the first rotor a restraining torque whose magnitude is proportional to the angular velocity of the first rotor, and pick-off devices associated with the two rotors, each pick-off device being arranged to generate an electrical signal dependent upon the angular velocity of its associated rotor.

The phrase "blades of infinite pitch," used in connection with the second rotor, is intended to denote radially disposed planar blades such that the axis of rotation of the second rotor lies in the plane of each one of the blades of the rotor.

In order that the invention may be clearly understood four embodiments of mass flow sensing unit in accordance therewith and particularly designed to measure the mass flow rate of a liquid will now be described by way of example only, reference being made to the accompanying drawings in which:

FIGURE 1 shows a schematic axial sectional view of a first embodiment of mass flow sensing unit;

FIGURES 2 and 3 show similar views of the second and third embodiments respectively, these two embodiments both having an additional upstream rotor with blades of helical pitch, and FIGURE 4 shows in more detail, again in axial sectional view, an embodiment of mass flow sensing unit generating similar to that shown in FIGURE 1 but including an arrangement providing automatic temperature compensation for the restraining means.

The same reference numerals have been used to designate similar parts in each of the four figures.

Referring now to FIGURE 1, the first embodiment of mass flow sensing unit comprises a conduit or pipe section 1 through which a liquid may be arranged to flow in the direction of the arrow 2. The rotors are mounted within the conduit 1, namely a first rotor 3 having blades 4 of helical pitch and, downstream of the rotor 3, a second rotor 5 or "paddle wheel" having blades 6 of infinite pitch. Means are provided for mounting the rotors 3, 5 coaxially with one another and with the axis of the conduit 1; in the embodiment shown, these means comprise a streamlined fairing 7 including bearings permitting free axial rotation of spindle 8 of the first rotor 3, and a similar downstream fairing 9 in which the spindle 10 of paddle wheel 6 is similarly mounted for free axial rotation. Fairing 7 is supported from conduit 1 by flow-straightening blades 11, while downstream fairing 9 is supported from the conduit by simple radial arms 12.

It will thus be seen that the first rotor 3 is mounted within the conduit 1 for rotation by liquid flowing in the direction of the arrow 2, while the second rotor 5 or paddle wheel is hydraulically coupled to the first rotor so as to be rotated by liquid leaving the rotor 3. Both rotors are mounted for free axial rotation, but restraining means are provided for the rotor 3 such that the torque applied to this rotor is a function of its angular velocity. In this particular embodiment, the restraining means comprises an eddy-current brake schematically indicated at 13.

External to the conduit 1 and associated with the rotors 3, 5 are disposed two conventional electro-magnetic pick-off devices 14, 15 such that the device 14 is adapted to generate an electrical signal having a frequency proportional to the angular velocity of rotor 3, while device 15 is adapted to generate an electrical signal having a frequency proportional to the angular velocity of the second rotor 5.

The method of operation of the sensing unit will readily be appreciated from the following mathematical relationships. In particular, if $N$ and $N^1$ represent respectively the number of revolutions executed per second by the first rotor 3 and the second rotor 5 in response to the flow of a liquid, then the torque exerted by the eddy-current brake 13 on the rotor 3 obeys the relationship:

$$\text{Restraining torque} = KN$$

$K$ being a constant of proportionality.

Under steady state conditions, the restraining torque is equal to the torque produced by the rotor 3. It can be shown that:

$$\text{Torque produced by rotor } 3 = CVdN^1$$

where:

$C$ is a constant.
$V$ is liquid velocity.
$d$ is liquid density.

Thence $$KN = CVdN^1$$

or $$\frac{N}{N^1} = \frac{C}{K}Vd$$

That is to say, the mass flow rate is proportional to the ratio of the two rotor velocities. Since the pick-off devices 14, 15 produce electrical signals having frequencies proportional to these two angular velocities, it will readily be appreciated that the signals obtained from the mass flow sensing unit are in a particularly convenient form for simple computation of the rate or amount of flow of fluid in terms of mass passing through the sensing unit.

Referring now to the second embodiment of mass flow sensing unit shown in FIGURE 2, the unit is generally similar to that previously described but includes a further rotor 16 having blades 17 of helical pitch, the pitch of blades 17 being opposite to the pitch of blades 4 of rotor 3. Rotor 16 is mounted upstream of rotors 4, 5 by means of fairing 18 having bearings permitting axial rotation of rotor spindle 19. Fairing 18, as with fairing 7 of FIGURE 1, is supported within conduit 1 by means of flow-straightening blades 20.

Spindle 8 of rotor 3 in this case extends through a bush 21 supported within conduit 1 by flow-straightening blades 22, and the upstream end of spindle 8 forms part of an eddy-current brake 13 coupling the rotors 3, 16.

Using the same symbols as before, if the pitches of blades 4 and 17 are opposite and equal it can be shown that:

Restraining torque $= K.2N$ and equating this to the torque produced by the rotor 3, $$2KN = CVdN^1$$

or $$\frac{N}{N^1} = \frac{C}{2K} Vd$$

Thus the necessary specific torque, K, of the eddy-current brake 13 has been reduced compared with that of the first embodiment by a factor of 2.

The third embodiment of mass flow sensing unit shown in FIGURE 3 again employs a further upstream rotor 16 with blades 17 of equal and opposite pitch to the blades 4 of the rotor 3, but in this case the two rotors 3 and 16 are coupled hydraulically as well as by eddy-current coupling through brake 13. That is to say, no flow-straightening blades are provided between these two rotors, rotor 16 being mounted for axial rotation on spindle 8 of rotor 3. As in the embodiment of FIGURE 1, this spindle 8 is in itself mounted on bearings in fairing 7 supported from conduit 1 by flow-straightening blades 11 upstream of all three rotors 5, 3 and 16.

In this case, using the same symbols and denoting the pitch of rotor 3 by P it can be shown that:

$$\frac{N}{N^1} = \frac{C}{K} \cdot VdP$$

where $$\frac{C}{K} = A \text{ constant}$$

In all these embodiments, therefore, the mass flow of the liquid can readily be deduced by comparison of the signals generated by the pick-off devices 14, 15, since these signals are dependent upon the angular velocities of their associated rotors and the ratio between these angular velocities is directly proportional to the product of the velocity and density of the liquid, i.e. the mass flow.

The fourth embodiment of mass flow sensing unit shown in FIGURE 4 is generally similar to the embodiment of FIGURE 1, having only a first or upstream rotor 3 with blades 4 of helical pitch and a second or downstream rotor 5 having blades 6 of infinite pitch. The rotors 3 and 5 are coaxially supported within the conduit 1 by streamlined fairings 7 and 9, spaced from the conduit by flow-straightening blades 11 and 12, which fairings in the present embodiment serve as mountings for a common spindle 23 for the rotors 3 and 5. These rotors are capable of free rotation about the spindle 23 by means of individual ball races 24, 25, 26 and 27 and their axial positions on the common spindle are maintained through spacers 28, 29, 30, 31 and 32. The spindle itself is prevented from rotating by a locking screw 33, and the fairings 7 and 9 are likewise maintained in position by spacer 34 and circlip 35 at one end of the conduit and spacer 36 and circlip 37 at the other end.

Rotor 3 is restrained by means of an eddy-current brake. This comprises a cylindrical magnet 38 rigidly attached to the spindle 23 by means of a magnet carrier 39 and magnet carrier locking screw 40. Co-axially surrounding this magnet is a drag cylinder 41 integrally part of the hub of rotor 3 and thus rotating with rotor 3. The drag cylinder 41 is made from a non-magnetic electrically conducting material which may be typically copper, manganin, or mancolloy. Co-axially surrounding the drag cylinder is a soft magnetic shroud 42 fixed to the streamlined fairing 7 and hence non-rotating, which acts as a return path for the magnetic flux produced by the magnet 38. Co-axial with the magnet 38, but displaced from it axially, is a soft magnetic disc 43 constrained in its axial porsition relative to magnet 38 by means of bimetallic disc-springs 44 and mono-metallic disc-springs 45. The bimetallic disc-springs 44 are so constructed that the axial length of the spring arrangement is a function of the temperature of the device, such that when the temperature increases, the axial length increases, thus altering the relative axial positions of magnet 38 and magnetic disc 43. This in turn alters the proportion of magnetic flux penetrating the drag cylinder 41 and so maintains the torque produced by the eddy-current brake substantially independent of temperature.

Two conventional electro-magnetic pick-off devices 14 and 15 are provided; their nature and disposition, and the method of operation of the sensing unit, are exactly as described in connection with the embodiment of FIGURE 1.

In each of the embodiments of FIGURES 1 to 4 the restraining means has been described and illustrated as an eddy-current brake, but other forms of restraining means are contemplated and those skilled in the art will readily appreciate that a liquid viscous brake, for example, could be substituted for the eddy-current brake. Such hydraulic restraining means may be designed to operate by using the viscous properties of liquid passing through the sensing unit.

The pick-off devices 14 and 15 may be of any convenient construction to give output signals proportional to the angular velocities of the associated rotors, and devices of this kind are well-known to those skilled in the art. For example, each of the pick-off devices outlined in FIGURE 4 may include a permanent magnet axially disposed in the device and surrounded by a coil the leads from which are taken to a connector at the top of the device. The presence of a rotor blade near the magnet varies the magnetic reluctance, and this variation in the magnetic field from the permanent magnet as each rotor blade passes the coil induces an alternating voltage across the coil. The frequency of this induced electrical signal is proportional to the number of rotor blades and the angular velocity of the rotor.

I claim:

1. A mass flow sensing unit comprising a conduit through which a fluid may be arranged to flow, a first rotor mounted within the conduit for rotation by the flow of fluid about an axis running lengthwise of the conduit and provided with helical fluid passageways therethrough, a second rotor mounted coaxially with the first rotor downstream thereof for rotation by fluid leaving the first rotor and provided with fluid passageways running parallel with the said axis, restraining means for applying to the first rotor a restraining torque whose magnitude is proportional to the angular velocity of the first rotor, and pick-off devices associated with the two rotors, each pick-off device being arranged to generate an electrical signal dependent upon the angular velocity of its associated rotor.

2. A mass flow sensing unit comprising a conduit through which a fluid may be arranged to flow, a first rotor having blades of helical pitch mounted within the conduit for rotation by the flow of fluid about an axis running lengthwise of the conduit, a second rotor having blades of infinite pitch mounted coaxially with the first rotor downstream thereof for rotation by fluid leaving the first rotor, restraining means for applying to the first rotor a restraining torque whose magnitude is proportional to the angular velocity of the first rotor, and pick-off devices associated with the two rotors, each pick-off device being arranged to generate an electrical signal dependent upon the angular velocity of its associated rotor.

3. A mass flow sensing unit according to claim 2, wherein there is provided upstream of the first rotor a further rotor mounted coaxially with the first and second rotors, the said further rotor having blades of a helical pitch opposite to the pitch of the blades of the first rotor and the first and further rotors being coupled together by the restraining means.

4. A mass flow sensing unit according to claim 3, wherein flow-straightening means are provided between the first and further rotors.

5. A mass flow sensing unit according to claim 3, wherein the first and further rotors are also coupled together hydraulically, the arrangement being such that fluid may flow directly and without impediment between the rotors.

6. A mass flow sensing unit according to claim 2, wherein the restraining means comprises an eddy-current brake.

7. A mass flow sensing unit according to claim 2, wherein means are provided to maintain the restraining torque substantially independent of temperature variations.

8. A mass flow sensing unit according to claim 6, wherein the first and second rotors are mounted for free rotation about a common non-rotatable spindle and the eddy-current brake comprises a cylindrical magnet rigidly attached to the spindle, a non-magnetic electrically conducting drag cylinder rigid with the first rotor and coaxially surrounding the magnet, and a nonrotating soft magnetic shroud coaxially surrounding the drag cylinder to act as a return path for the magnetic flux from the magnet.

9. A mass flow sensing unit according to claim 8, wherein a soft magnetic disc is mounted on the common spindle adjacent the magnet but spaced therefrom by bimetallic spacing means, the soft magnetic disc being movable along the spindle under the influence of the bimetallic spacing means so as to alter the magnetic flux distribution through the drag cylinder and maintain the restraining torque produced by the eddy-current brake substantially independent of temperature.

References Cited by the Examiner
UNITED STATES PATENTS

| | | | |
|---|---|---|---|
| 3,043,138 | 7/62 | Waugh | 73—194 |
| 3,043,139 | 7/62 | Waugh et al. | 73—194 |
| 3,043,140 | 7/62 | Waugh et al. | 73—194 |
| 3,043,141 | 7/62 | Waugh et al. | 73—194 |

RICHARD C. QUEISSER, *Primary Examiner.*

DAVID SCHONBERG, *Examiner.*